(12) United States Patent
Sathrum

(10) Patent No.: US 9,722,236 B2
(45) Date of Patent: Aug. 1, 2017

(54) APPARATUS AND METHOD FOR USE IN STORING ENERGY

(71) Applicant: General Atomics, San Diego, CA (US)

(72) Inventor: Aaron J. Sathrum, San Diego, CA (US)

(73) Assignee: General Atomics, San Diego, CA (US)

(*) Notice: Subject to any disclaimer, the term of this patent is extended or adjusted under 35 U.S.C. 154(b) by 1009 days.

(21) Appl. No.: 13/843,489

(22) Filed: Mar. 15, 2013

(65) Prior Publication Data

US 2014/0266058 A1 Sep. 18, 2014

(51) Int. Cl.
*H02J 7/00* (2006.01)
*H01M 2/34* (2006.01)
*H01M 10/06* (2006.01)
*H01M 10/44* (2006.01)
*H01M 10/46* (2006.01)

(52) U.S. Cl.
CPC ........... *H01M 2/342* (2013.01); *H01M 10/06* (2013.01); *H01M 10/44* (2013.01); *H01M 10/46* (2013.01); *H02J 7/0068* (2013.01); *Y02E 60/126* (2013.01)

(58) Field of Classification Search
USPC .................................................. 320/138, 157
See application file for complete search history.

(56) References Cited

U.S. PATENT DOCUMENTS 4,411,969 A 10/1983 Sundberg
5,612,148 A 3/1997 Zito
5,650,239 A 7/1997 Lex et al.
5,652,497 A * 7/1997 Boivie ........................ 320/128
(Continued)

FOREIGN PATENT DOCUMENTS

GB 2187903 9/1987
JP 06018471 3/1994
(Continued)

OTHER PUBLICATIONS

PCT; International Search Report and Written Opinion of the International Searching Authority for International Patent Application No. PCT/US2014/025104 mailed Jul. 11, 2014.
(Continued)

*Primary Examiner* — Samuel Berhanu
(74) *Attorney, Agent, or Firm* — Fitch, Even, Tabin & Flannery LLP

(57) ABSTRACT

Some embodiments provide energy storage systems that comprise: a first electrode; a second electrode; an electrolyte; the first electrode, the second electrode and the electrolyte are positioned such that the electrolyte is in contact with at least the first electrode; and a polarity reversal system electrically coupled with the first electrode and the second electrode, wherein the polarity reversal system is configured to allow the energy storage system to operate while a first polarity to charge and discharge electrical energy while operating in the first polarity, and the polarity reversal system is configured to reverse the voltage polarity across the first and second electrodes to a second polarity to allow the energy storage system to continue to operate while the second polarity is established across the first electrode and the second electrode to continue to charge and discharge electrical energy while operating in the second polarity.

17 Claims, 9 Drawing Sheets

(56) References Cited

U.S. PATENT DOCUMENTS

| | | | |
|---|---|---|---|
| 5,891,590 | A | 4/1999 | King |
| 6,479,966 | B2 | 11/2002 | Chiang et al. |
| 6,887,600 | B2 | 5/2005 | Morrissey et al. |
| 6,986,966 | B2 | 1/2006 | Clarke et al. |
| 7,160,639 | B2 | 1/2007 | Johnson et al. |
| 8,048,555 | B2 | 11/2011 | Darcy et al. |
| 2004/0067410 | A1* | 4/2004 | Jones .......................... 429/51 |
| 2008/0157718 | A1* | 7/2008 | Ohnuki ....................... 320/134 |
| 2010/0227204 | A1 | 9/2010 | Zito |
| 2011/0033733 | A1* | 2/2011 | Ouchi ..................... B60L 7/18 |
| | | | 429/49 |
| 2011/0117395 | A1 | 5/2011 | Roodenburg |
| 2011/0171502 | A1 | 7/2011 | Kottenstette et al. |

FOREIGN PATENT DOCUMENTS

| | | |
|---|---|---|
| JP | 07073062 | 8/1995 |
| JP | 2010129538 | 6/2010 |

OTHER PUBLICATIONS

Oury et al.; Oxygen evolution on alpha-lead dioxide electrodes in methanesulfonic acid; Electrochimica Acta 63 (2012); Dec. 17, 2011; pp. 28-36; vol. 63.

Oury et al.; PbO2/PB2+ cycling in methanesulfonic acid and mechanisms associated for soluble lead-acid flow battery applications; Electrochimica Acta 71 (2012); Mar. 30, 2012; pp. 140-149; vol. 71.

Oury et al.; Potential Response of Lead Dioxide/Lead(II) Galvanostatic Cycling in Methanesulfonic Acid: A Morphologico-Kinetics Interpretation; Journal of the Electrochemical Society (2013); Nov. 19, 2012; pp. A148-A154, vol. 160(1).

Verde et al.; Achieving High Efficiency and Cyclability in Inexpensive Soluble Lead Flow Batteries; Energy & Environmental Science; Mar. 14, 2013, 11 pages.

Zhang et al.; The performance of a soluble lead-acid flow battery and its comparison to a static lead-acid battery; Energy Conversion and Management 52 (2011); Sep. 3, 2011; pp. 3391-3398; vol. 52.

Ponce De Leon et al.; Redox flow cells for energy conversion; Journal of Power Sources 160 (2006); May 26, 2006; pp. 716-732; vol. 160.

Willis et al.; Developments in the soluble lead-acid flow battery; Journal of Applied Electrochemistry 40 (2010); Mar. 1, 2009; pp. 955-965; vol. 40.

Weber et al.; Redox flow battery: a review; Journal of Applied Electrochemistry 41 (2011); Sep. 2, 2011; pp. 1137-1164; vol. 41.

Hazza et al.; A novel flow battery: A lead acid battery based on an electrolyte with soluble lead(II) Part I: Preliminary studies; Physical Chemistry Chemical Physics (2004); Mar. 9, 2004; pp. 1773-1778; Issue 6.

Pletcher et al.; A novel flow battery: A lead acid battery based on an electrolyte with soluble lead(II) Part II. Flow cell studies; Physical Chemistry Chemical Physics (2004); Mar. 9, 2004; pp. 1779-1785; Issue 6.

Pletcher et al., A novel flow battery—A lead acid battery based on an electrolyte with soluble lead(II) III. The influence of conditions on battery performance; Journal of Power Sources 149 (2005); Mar. 17, 2005; pp. 96-102; vol. 149.

Hazza et al.; A novel flow battery—A lead acid battery based on an electrolyte with soluble lead(II) IV. The influence of additives, Journal of Power Sources 149 (2005), Mar. 22, 2005; pp. 103-111; vol. 149.

Pletcher et al.; A novel flow battery—A lead-acid battery based on an electrolyte with soluble lead(II) V. Studies of the lead negative electrode; Journal of Power Sources 180 (2008); Mar. 10, 2008; pp. 621-629; vol. 180.

Pletcher et al.; A novel flow battery—A lead-acid battery based on an electrolyte with soluble lead(II) Part VI. Studies of the lead dioxide positive electrode; Journal of Power Sources 180 (2008); Mar. 10, 2008; pp. 630-634; vol. 180.

Li et al.; A novel flow battery: A lead acid battery based on an electrolyte with soluble lead(II) Part VII. Further studies of the lead dioxide positive electrode; Electrochimica Acta 54 (2009); Apr. 7, 2009; pp. 4688-4695; vol. 54.

Collins et al.; A novel battery: A lead acid battery based on an electrolyte with soluble lead(II) Part VIII. The cycling of a 10 cm x 10 cm flow cell; Journal of Power Sources 195 (2010); Sep. 26, 2009; pp. 1731-1738; vol. 195.

Collins et al., A novel flow battery: A lead acid battery based on an electrolyte with soluble lead(II). Part IX: Electrode and electrolyte conditioning with hydrogen peroxide; Journal of Power Sources 195 (2010); Nov. 13, 2009; pp. 2975-2978; vol. 195.

\* cited by examiner

Cell efficiency data for beaker cell having undergone polarity inversion after cell failure.

APPARATUS AND METHOD FOR USE IN STORING ENERGY

The United States Government may have rights in this invention pursuant to Contract No. #DE-AR0000124 Cooperative Agreement between the Advanced Research Projects Agency-Energy (ARPA-E)—U.S. Department of Energy and General Atomics.

BACKGROUND

1. Field of the Invention

The present invention relates generally to energy storage, and more specifically to storing energy through electrochemical reactions.

2. Discussion of the Related Art

Many types of batteries and other power cells are known. These batteries have a relatively wide range of capacities, rates, potentials, electrical couples and the like. Such batteries or cells are used for a wide variety of commercial, residential and/or industrial applications.

There are several types of batteries available for such types of applications. For example, buildings containing lead acid batteries are placed throughout rural areas and within urban areas for electrical energy storage. These batteries are used, for example, to stabilize power and/or to keep telephones, cable TV, Internet data centers and other such facilities functional when power is otherwise lost, there is a peak demand, or other such factors.

SUMMARY OF THE INVENTION

Several embodiments advantageously address the needs above as well as other needs by providing systems and methods of storing energy and distributing the stored energy through repeated charge and discharge cycles. Some embodiments provide energy storage systems that comprise: a first electrode; a second electrode; an electrolyte; a housing in which at least a portion of the first electrode, at least a portion of the second electrode and at least a portion of the electrolyte are positioned such that the electrolyte is in contact with at least the first electrode; and a polarity reversal system electrically coupled with the first electrode and the second electrode, wherein the polarity reversal system is configured to allow the energy storage system to operate while a first polarity is established across the first electrode and the second electrode to charge and discharge electrical energy while operating in the first polarity, and the polarity reversal system configured to reverse the voltage polarity across the first electrode and the second electrode to a second polarity that is opposite the first polarity to allow the energy storage system to continue to operate while the second polarity is established across the first electrode and the second electrode to continue to charge and discharge electrical energy while operating in the second polarity.

In other embodiments, methods of providing electrical energy comprise: repeatedly charging and discharging a first energy storage unit while in a first polarity to provide electrical power during the discharging to a load; reversing a polarity of the first energy storage unit to a second polarity opposite the first polarity after the repeatedly charging and discharging the first energy storage unit while in the first polarity; and repeatedly charging and discharging the first energy storage unit while in the second polarity to continue to provide substantially the same electrical power to the load during the discharging while in the second polarity as provided during the discharging while in the first polarity.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
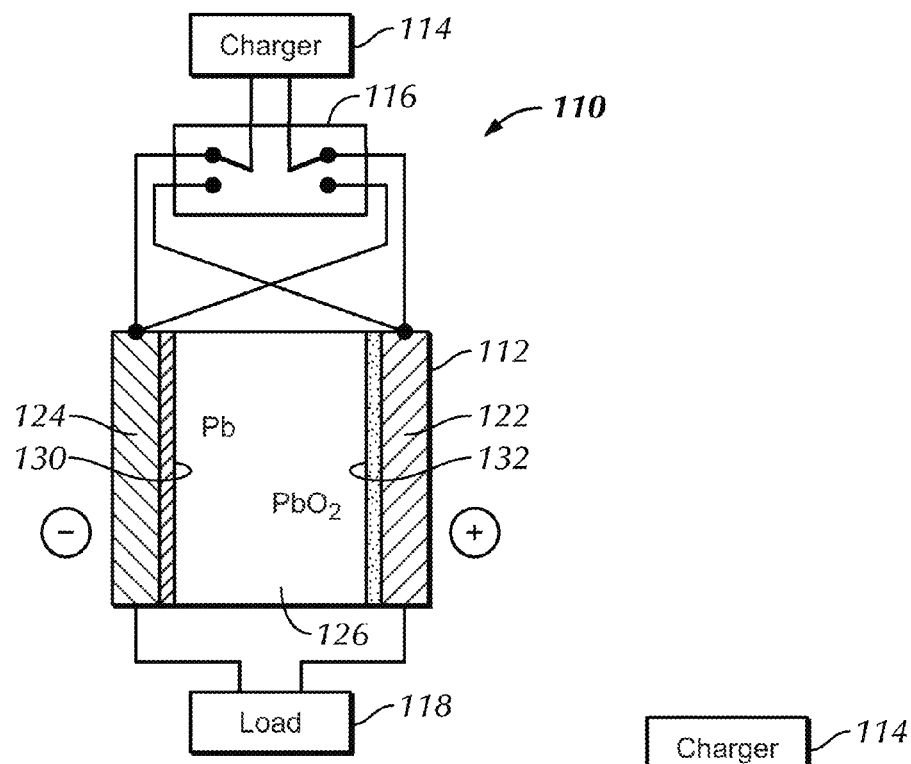
FIG. 1 shows a simplified block diagram of an energy storage system in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Some present embodiments provide energy storage systems or apparatuses that operate regardless of opposite voltage polarity. Further, by regularly switching between polarities these embodiments improve operation of the energy storage systems. Some embodiments provide an energy storage system that store and release electrical energy through chemical reactions.

FIG. 1 shows a simplified block diagram of an energy storage system 110 in accordance with some embodiments. In some embodiments, the energy storage system 110 comprises one or more energy storage cells or units 112, charge source or charger 114 and polarity reversal or switching system 116. The energy storage unit 112 couples with the charge source 114 through the polarity reversal or switching system 116. A load 118 can be coupled with the energy storage unit 112 to receive electrical power.

The energy storage unit comprises one or more pairs of electrodes 122, 124, and in some implementations includes an electrolyte 126 that is contained to contact with at least portions of both electrodes 122, 124. In some embodiments, the energy storage unit 112 comprises one or more electrochemical cells configured to store electrical energy through chemical reactions. Accordingly, when an electrical differential is established between the two electrodes 122, 124 during a charging, chemical reactions occur causing a deposit 130, 132 to form on at least one of the electrodes (e.g., electrode 122). During discharge supplying electrical power to the load 118, the deposit(s) 130, 132 are released, and in some implementations a reverse chemical reaction occurs. In some embodiments, the electrolyte 126 comprises a conductive material (e.g., a metal ion) that during charging is deposited onto one of the electrodes 122.

For example, in some implementations, the electrolyte 126 comprises a lead ion, such as lead (II) deposited in an acid solution (e.g., methanesulfonic acid). The electrodes 122, 124 can be graphite plate electrodes. Based on the electrode reactions of the lead in solution, the following electrode reaction occurs during charging:

$$2Pb^{2+}+2H_2O-2e^- \rightarrow Pb+PbO_2+4H^+ \text{ (charging)}. \qquad \text{eq. 1}$$

With the voltage differential applied between the two electrodes 122, 124, lead is deposited 130 onto the negative electrode 124. Further, in some implementation lead dioxide $PbO_2$ is deposited 132 onto the positive electrode 122. Again, in some embodiments, an opposite reaction can occur during discharge:

$$2Pb^{2+}+2H_2O-2e^- \leftarrow Pb+PbO_2+4H^+ \text{ (discharging)}.$$

Accordingly, the deposited conductive material, metal or other deposit material is released providing power to the load 118.

It is noted, however, that over many cycles of charging and discharging (e.g., more than five cycles, typically more than 10 cycles) many factors can contribute to a decrease in performance and/or eventual failure of the energy storage system 110. For example, with electrodes, electrolytes and/or some chemical reactions an accumulation of one or more of the deposits 130, 132 can occur, such as due to imbalances in faradaic (charge) efficiency. In some instances, a deposit (e.g., lead dioxide $PbO_2$) can build up or "creep" over the electrode 122, 124 and/or other surfaces (e.g., non-conductive surfaces), and eventually potentially result in an electrical short. For example, during the charge cycles on a positive electrode conductive lead dioxide is deposit predominately in a perpendicular direction to the electrode surface; however, some lead dioxide can extend parallel and along edges of the electrodes and/or in some instances may even extend on adjacent surfaces.

Additionally, it is often seen that upon complete depth of discharge, a small amount of the lead dioxide may remain on the surface of the electrode 422. Since lead dioxide is conductive, over many cycles it can grow over unwanted areas that are meant to be non-conductive in the energy storage unit 412 or cell. This action, however, can grow on the sidewalls of the energy storage unit housing or chamber (e.g., in a bipolar plate configuration) and eventually can result in battery failure due to a direct electrical short. Similarly, a deposit (e.g., lead Pb) can build up, such as extend in one or more protrusions or dendrites that can potentially extend across the distance between electrodes causing a short across the gap. Further, an accumulation of one or both deposits 130, 132 on or extending from the electrodes 122, 124 reduces the useful components (e.g., lead ions Pb2+) from the electrolyte solution resulting in a decrease in energy capacity, some times referred to as fade.

Accordingly, some present embodiments are configured to continue to operate in a reverse polarity without adverse affects to the energy storage system 110. As is known, it is typically catastrophic to reverse the polarity on other batteries or other similar energy storage cells. At least some present embodiments, however, are configured to operate substantially equally in either polarity to continue to operate through multiple charge and discharge cycles in either polarity configuration, typically multiple consecutive charge/discharge cycles, and while allowing the polarity to be repeatedly reversed while still storing energy and supplying energy to the load 118 regardless of the polarity.

Figure 2:
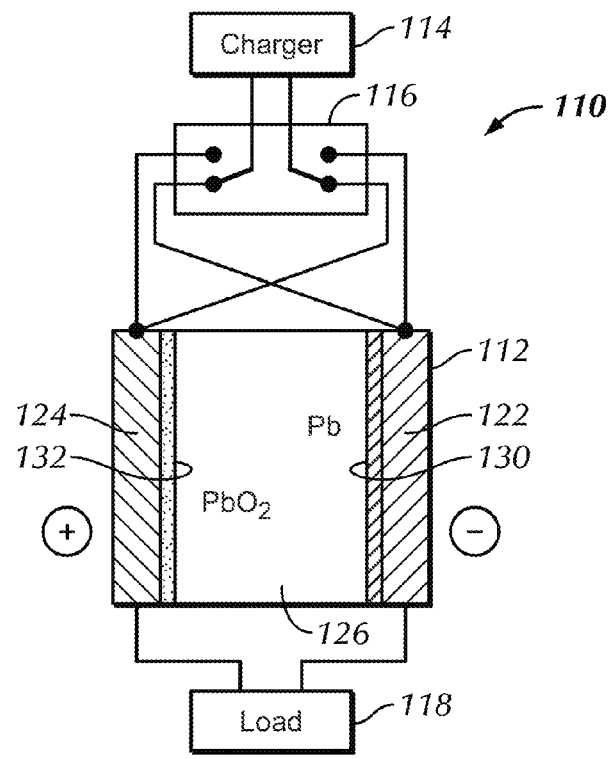
FIG. 2 shows a simplified block diagram of the energy storage system of FIG. 1 with the polarity reversed across an energy storage unit, in accordance with some embodiments.

FIG. 2 shows a simplified block diagram of the energy storage system 110 of FIG. 1 with the polarity reversed across the energy storage unit 112, in accordance with some embodiments. The polarity reversal system 116 is activated to reverse the polarity such that the first electrode 122 that was at the positive or greater voltage potential is now the negative potential, and the second electrode 124 that was at the negative or lower potential is now the positive potential.

The same electrolyte 126 continues to exist in the energy storage unit 112. Accordingly, the deposits 130, 132 are reversibly electrodeposited and stripped from the surfaces of the electrode 122, 124. In some embodiments, the bipolar electrode design provides for a complete reversal of polarity of the electrodes with respect to an original configuration (e.g., FIG. 1). The polarity reversal forces the current to flow in the opposite direction and a stripping of the deposits 130, 132 from the electrode surfaces occur.

Unlike other systems, however, the energy storage system 110 can continue to operate normally in the reversed polarity to continue to be charged and discharged to supply power to the load 118 through numerous charge/discharge cycles, if not hundreds of cycles. The energy storage system 110 can then again reverse the polarity back to the alternate polarity (e.g., the original polarity as depicted in FIG. 1) to again provide stripping of accumulated deposits 130, 132 on the electrodes 122, 124 while allowing the energy storage system 110 to continue to be charged and discharged through numerous cycles while in the original voltage polarity orientation. Accordingly, the energy storage system 110 can continue to operate in either polarity through multiple repeated charge and discharge cycles without harm to the system and allowing for subsequent polarity reversal as desired to improve performance and/or maintain efficient operation of the energy storage system 110. The energy storage system 110 can operate through numerous repeated charge and discharge cycles while in a first polarity, then the polarity reversed to allow numerous and repeated charge and discharge cycles while in the reversed polarity before again reversing to the original polarity to again allow repeated charge and discharge cycles.

The energy storage system 110 can be utilized with substantially any power source and load such that the energy storage system 110 converts and stores electrical energy from the one or more charger sources 114 into chemical energy and releases the stored energy in a controlled fashion when desired to the one or more loads 118. For example, the charge source 114 can be substantially any energy source, such as but not limited to solar cells, wind turbines, hydro-electric generators, automobiles and the like. Similarly, the loads 118 can be substantially any load that can utilize power delivered by the energy storage unit 112.

Figure 3:
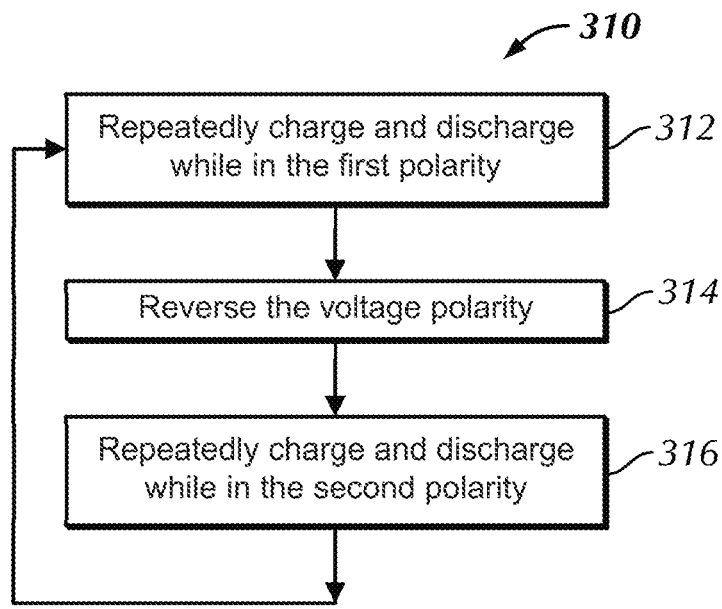
FIG. 3 depicts a simplified flow diagram of a process of continually charging and discharging of an energy storage system, in accordance with some embodiments.

FIG. 3 depicts a simplified flow diagram of a process 310 of continually charging and discharging of an energy storage system, such as the energy storage system 110 of FIGS. 1 and 2, in accordance with some embodiments. In step 312, an energy storage system and/or chemical cell is repeatedly charged and discharged while in a first polarity to provide electrical power during the discharging to a load 118. In step 314, the voltage polarity of the energy storage system or cell is reversed to a second polarity opposite the first polarity after having repeatedly charged and discharged the energy storage system or cell while in the first polarity. In step 316, the energy storage system or cell is again repeatedly charged and discharged while in the second polarity to continue to provide substantially the same electrical power to the load during the discharging while in the second polarity as provided during the discharging while in the first polarity.

Further, the energy storage unit 112 in some embodiments is configured without a separator or membrane between the electrodes 122, 124. Further, many embodiments employ a single electrolyte 126 that is in contact with both electrodes 122, 124, and typically simultaneously in contact with both electrodes 122, 124. This provides a simplified configuration as compared to many other types of fluid cells and/or flow cell systems. It is noted, however, that some configurations may employ a separator and one or more relevant electrolytes.

Figure 4:
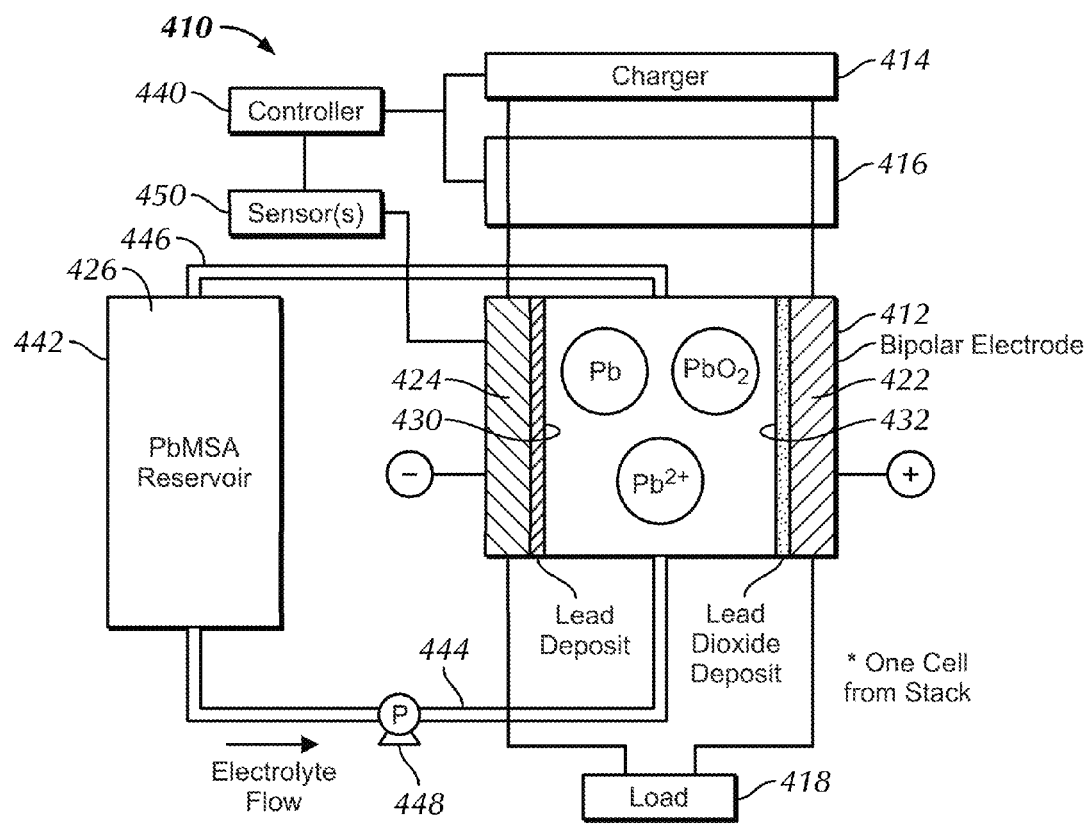
FIG. 4 shows a simplified block diagram of an electrical energy storage system, in accordance with some embodiments.

FIG. 4 shows a simplified block diagram of an electrical energy storage system 410, in accordance with some embodiments. The energy storage system 410 includes one or more energy storage units 412, charge source or charging source or system 414, polarity reversal system 416, an electrolyte 426, a controller 440, electrolyte reservoir or storage 442, one or more conduits 444, 446, and one or more pumps 448. One or more loads 418 can be coupled with the energy storage unit 112 to receive electrical power. Some embodiments include one or more sensors 450 or other such monitoring devices.

The energy storage unit 412 includes two or more electrodes 422, 424 separated by a distance with the electrolyte 426 contacting each of the electrodes 422, 424. For example, the electrodes 422, 424 can comprise graphite plates. The energy storage unit 412 couples with the charge source 414 through the polarity reversal system 416. The controller 440 coupled with the charge source 414 and the polarity reversal system 416. In some embodiments, the controller 440 further couples with one or more of the electrolyte reservoir 442, the sensor(s) 450, and the pump 448. Additionally, the controller may receive information from and/or provide information to the load 418, a remote source (not shown, such as a power utility company, a computer, a network of computers, portable device, etc.), or other relevant device.

The electrolyte reservoir 442 couples with the energy storage unit 412 through the conduits 444, 446 and the one or more pumps 448. The electrolyte reservoir stores the liquid electrolyte. The electrolyte 426 is pumped through the energy storage unit 412 to allow the chemical reactions to occur within the energy storage unit during the charge and discharge cycles as the electrolyte flows through the cell. As such, the energy storage system 410 can be considered a flow energy storage system or battery where the increased amount of electrolyte can allow for greater amounts of energy to be stored and provided to the load 418. Such flow energy storage systems can be utilized in any of numerous applications and/or situations, such as use with but not limited to generators (e.g., solar and/or wind generators), automobiles, and/or other such implementations. Further, these flow energy storage systems convert and store electrical energy into chemical energy and release the stored energy in a controlled fashion when desired.

In some embodiments, the energy storage unit 412 operates similar to the energy storage unit 112 of FIGS. 1-2. During charging, a chemical reaction occurs within the energy storage unit causing, in at least some embodiments, the deposition of a deposit material 430, 432 (e.g., a metal or other conductive material) onto one or more of the electrodes. As an example, in some embodiments the energy storage unit 412 comprises a soluble lead acid flow battery (SLAFB) system, where lead (Pb) 430 and lead dioxide ($PbO_2$) 432 are reversibly electrodeposited and stripped from surfaces of the electrode 422, 424. It is noted that in some embodiments, the chemical reactions occurring in the energy storage unit 412 may be such that the deposit material 430 and/or 432 may be deposited during discharge while being removed during charging.

Further, in some embodiments, the energy storage unit 412 is configured in a symmetric configuration, such as a symmetric bipolar configuration. Additionally, the energy storage unit 412 of some embodiments is configured without a separator or membrane (e.g., an ion transfer membrane) between the electrodes of the flow energy storage unit, and thus, does not inherently force a particular polarity for operation of the energy storage unit 412. Accordingly, the active anode and cathode electrodes, which are dependent on the applied voltage polarity, are reversible and the electrochemistry can continue to operate. This polarity reversal can effectively reset the electrode surface chemistry. The configurations without a membrane or separator typically provide some advantages over other types of flow cell or flow batteries. In part, the system significantly reduces the complexity utilizing the single electrolyte with the two electrode chemistries. This avoids separate electrolyte reservoirs, conduit systems, pumps, additional controls, monitoring and other such aspects of systems that employ a separator or membrane and separate electrolytes.

Figure 5:
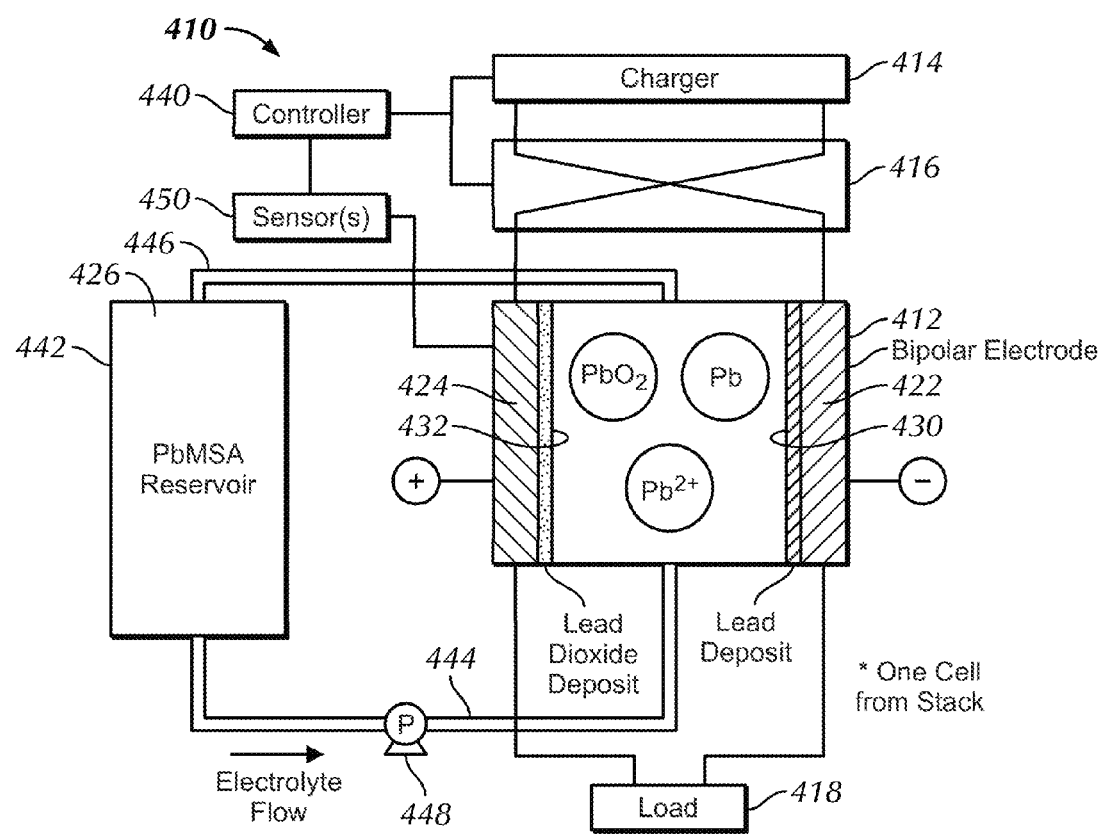
FIG. 5 shows the simplified block diagram of the energy storage system of FIG. 4 with the polarity reversal system 416 reversing the polarity across the energy storage unit, in accordance with some embodiments.

FIG. 5 shows the simplified block diagram of the energy storage system 410 of FIG. 4 with the polarity reversal system 416 reversing the polarity across the energy storage unit 412, in accordance with some embodiments. The polarity reversal system 416 is activated to reverse the polarity such that the first electrode 422 that was at the positive voltage (or at the greater voltage potential) is now the negative potential, and the second electrode 424 that was at the negative or lower potential is now the positive potential.

The electrolyte 426 continues to contact the electrodes 422, 424 allowing for the reversal of the deposition of the deposits 130, 132 and effectively stripping the deposits from the surfaces of the electrode while being deposited on the alternative electrode. For example, with similar chemistries as described above, during charging following the polarity reversal, the remaining lead dioxide $PbO_2$ deposit 432 one the first electrode 422 is stripped from the first electrode while lead Pb is deposited on the first electrode, and the remaining lead Pb deposit 430 on the second electrode 424 is stripped from the second electrode while lead dioxide is deposited onto the second electrode. Again, the energy storage system 410 continues to operate normally in the reversed polarity to be charged and discharged to store and supply power to the load 118 through numerous repeated and continuous cycles, if not hundreds of cycles, without damage to the energy storage system 410 or energy storage unit 412. Further, in some embodiments, the polarity reversal actually extends the useful life of the energy storage unit 412 and/or at least the long term effectiveness, if not the short term effectiveness, of the energy storage unit. The polarity can be reversed any number of times continuing to strip accumulation of deposits 130, 132 on the electrodes 122, 124 while allowing the energy storage system 110 to continue to operate to be charged and discharged through numerous cycles extending the useful life of the system.

In some embodiments, the controller 440 provides at least some control over the energy storage system 410. In part, the controller 440 can instruct the polarity reversal system 416 to implement the polarity reversal. For example, the controller 440 may count the number of charge discharge cycles while the energy storage system 410 is in a first polarity. When that count reaches a predefined count threshold, the controller 440 can activate the polarity reversal system 416 to reverse the polarity to the opposite second polarity. In some embodiments, the controller can monitor one or more sensors 450 and/or receive input from one or more sensors 450 to track and/or monitor one or more operating parameters. For example, the one or more sensors 450 can measure or determine voltage, current, voltage efficiency, current efficiency, energy efficiency, discharge voltage and/or other relevant parameters. The measured or determined results can be provided to the controller 440. In turn, the controller can determine whether one or more of the operational parameters has a predefined relationship with one or more thresholds and/or determine whether a change in operation of the energy storage system has a predefined relationship with a threshold, and to cause the polarity reversal system to reverse the voltage polarity in response to determining that the threshold has been reached and/or the change in operation of the energy storage system has the predefined relationship with the threshold. For example, the controller can determine whether the current and/or energy efficiencies drop below thresholds. In response, the controller can activate the polarity reversal system 416 to reverse the polarity across the energy storage unit 412. Accordingly, the energy storage system 410 can be monitored (e.g., monitoring the current and/or voltage response) to control the polarity reversal before the large drop off in energy efficiency occurs. Additionally or alternatively, a user can manually activate a polarity reversal, such as through a user interface of the controller or that is in communication with the controller (e.g., remote device).

Figure 6:
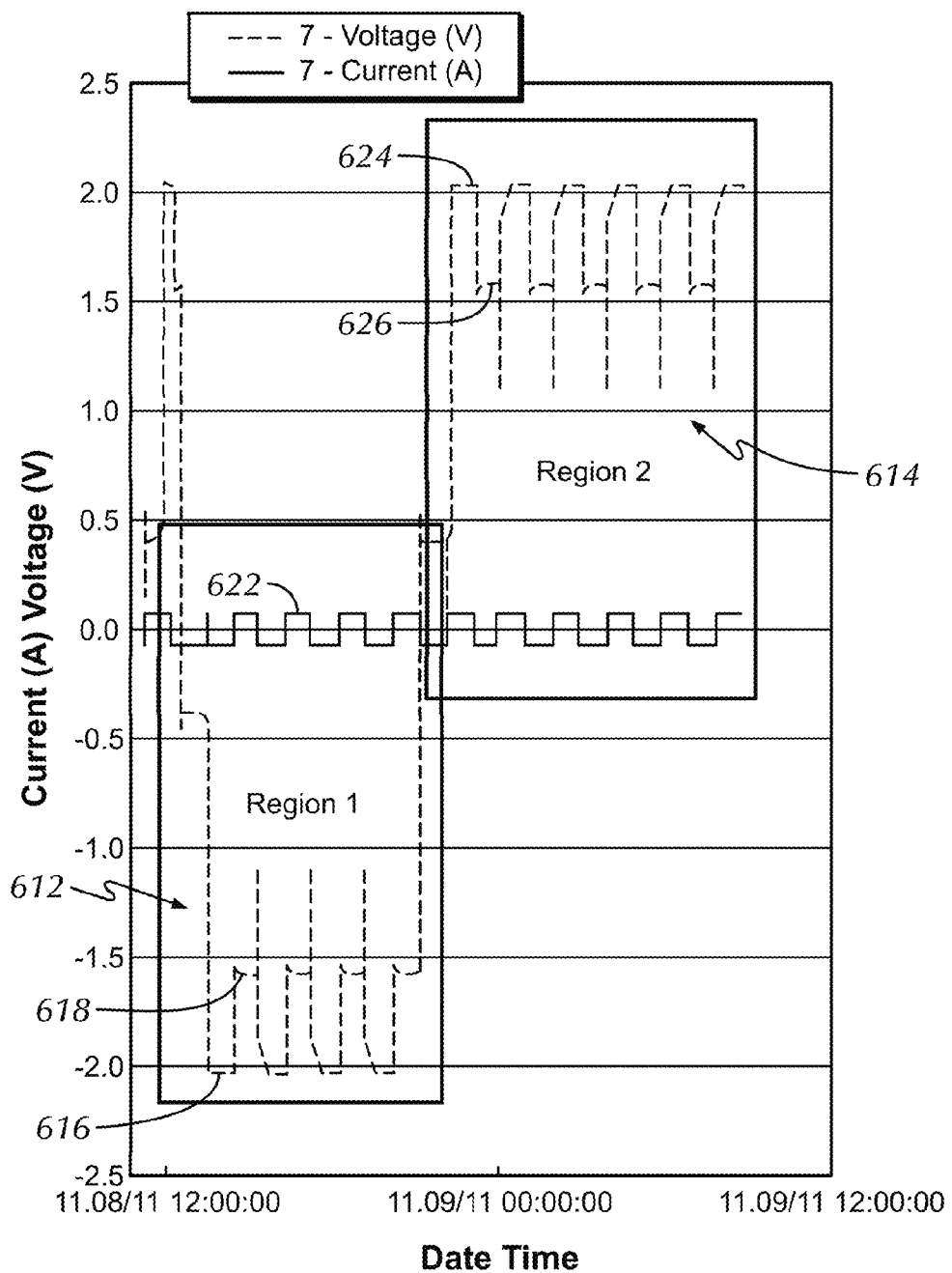
FIG. 6 shows an exemplary graphic representation of a first series of charge and discharge cycles while an energy storage system is in a first polarity, followed by a second series of charge and discharge cycles while the energy storage system is in the opposite second polarity, in accordance with some embodiments.

FIG. 6 shows an exemplary graphic representation of a first region with a first series 612 of charge and discharge cycles while the energy storage system 410 is in a first polarity, followed by a second region with a second series 614 of charge and discharge cycles while the energy storage system 410 is in the opposite second polarity, in accordance with some embodiments. The first series 612 shows the energy storage system 410 being charged 616 (at approximately −2.0 volts) followed by a discharge 618 (at approximately −1.6 volts), which is followed by three subsequent charge and discharge cycles, while the energy storage system is in a first polarity. In this example, each charge cycle is about an hour and each discharge cycle is about an hour, while providing a substantially consistent alternating current 622. Similarly, the second series 614 measured while the energy storage unit 412 in the opposite polarity shows the energy storage system 410 being charged 624 (at approximately −2.0 volts) followed by a discharge 626 (at approximately −1.6 volts), which is followed by four subsequent charge and discharge cycles, while the energy storage system is in the opposite second polarity. Again, each charge cycle is about an hour and each discharge cycle is about an hour, while continuing to provide the substantially constant alternating current 622.

Figure 7:
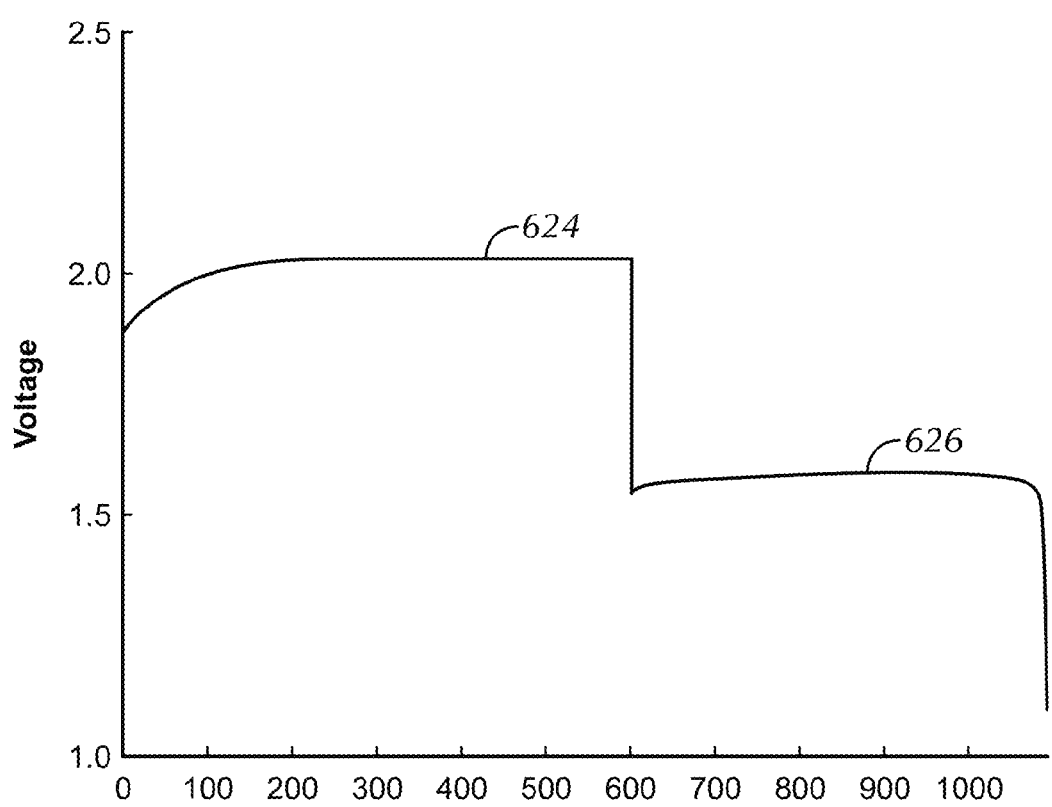
FIG. 7 shows a zoomed in graphic representation of an exemplary charge and discharge cycle of FIG. 6 while operating in the second polarity, in accordance with some embodiments.

FIG. 7 shows a zoomed in graphic representation of a charge and discharge cycle of FIG. 6 while operating in the second polarity, in accordance with some embodiments. Again, the energy storage system 410 is charged at about 2 V during the charge cycle 624 for about an hour, and the discharged for about an hour at about 1.6 V during the discharge cycle 626.

Figure 8:
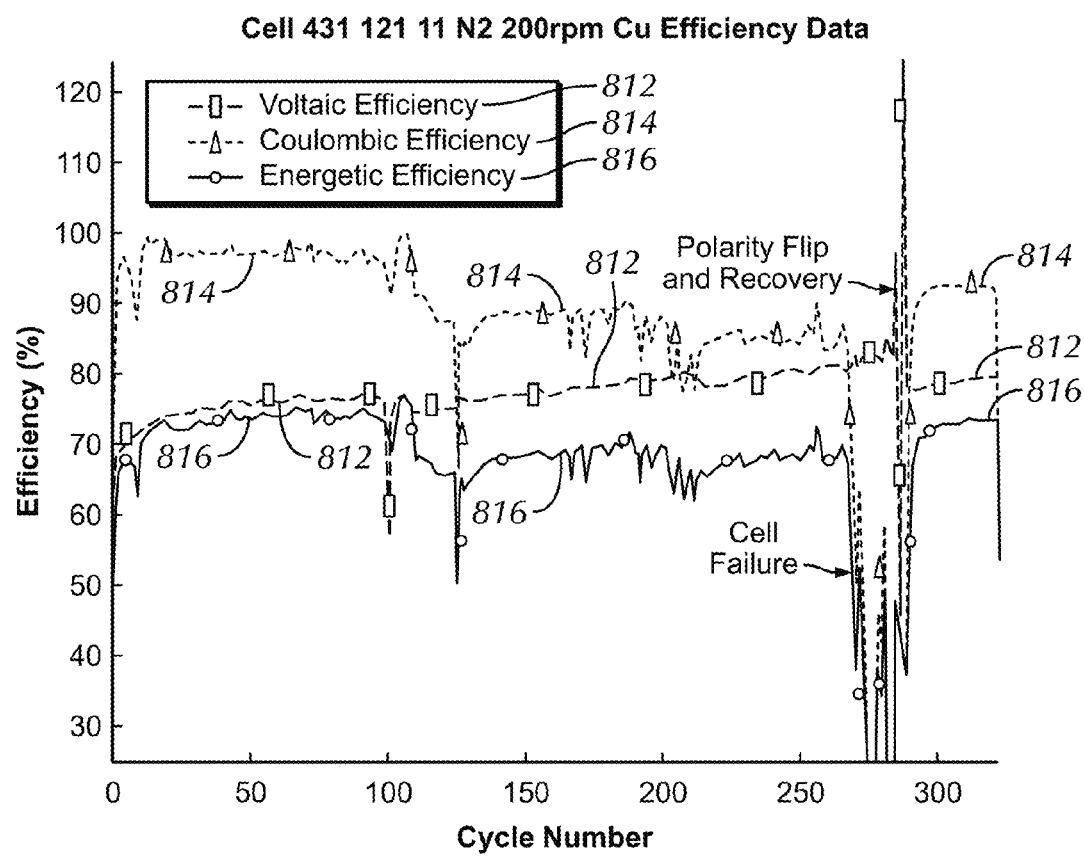
FIG. 8 shows graphical representations of an exemplary voltaic efficiency, coulombic efficiency and energetic efficiency for a series of charge and discharge cycles of an energy storage system, in accordance with some embodiments.

FIG. 8 shows graphical representations of voltaic efficiency 812, coulombic efficiency 814 and energetic efficiency 816 for a series of charge and discharge cycles of an energy storage system, such as the energy storage system 110 of FIG. 1, in accordance with some embodiments. The energy storage system that was tested to generate the graphic representations of FIG. 8 was configured within a beaker with 175 mL of electrolyte, with a lead-methanesulfonate concentration of 0.7M, and 4 mM of copper methanesulfonate, which was stirred at a speed of 200 RPM. The electrodes were two graphite plate electrodes positioned with 0.5 inch separation, each with 7.5 cm² surface area exposed to the electrolyte (with any additional area of the electrodes masked off from the electrolyte). The energy storage unit or cell was repeatedly charged at for one hour and discharged to 1.1 V using a constant current density of 20 mA/cm² while in a first polarity.

As show in FIG. 8, the coulombic efficiency 814 and energetic efficiency 816 remain relatively stable over the multiple cycles while the energy storage system was maintained in a first polarity, with a relatively small dip at about 110 cycles. The coulombic efficiency 814 and energetic efficiency 816 drastically dropped at about 275 charge discharge cycles while in the first polarity when a cell failure occurred. The voltaic efficiency 812 similarly was relatively stable while in the first polarity, with a gradual increase that is believed to be due to the increased surface areas of the electrodes due to build up and/or "creeping" of the deposited conductive material (e.g., creeping of the lead dioxide) which can result in lower current density at the electrode.

The polarity was flipped to the opposite second polarity at about 290 cycles. As can be seen, the current and voltage efficiencies recovered to previous values with the energy efficiency averaging about 73%. Table 1 below demonstrates the recovery of the energy storage system following the polarity reversal showing a comparison of the average efficiencies prior to the polarity reversal (for charge and discharge cycle numbers 2-250) and after the polarity reversal (for charge and discharge cycle numbers 280-320).

TABLE 1

Efficiency and Voltage Data with Polarity Flip Recovery

|  | Units | Pre-Flip Cycles 2-250 | Post-Flip Cycles 290-320 |
|---|---|---|---|
| Voltage Efficiency | % | 76.3 | 78.9 |
| Current Efficiency | % | 91.9 | 90.4 |
| Energy Efficiency | % | 70.3 | 71.3 |
| Charge Voltage | Volts | 2.01 | 2.04 |
| Discharge Voltage | Volts | 1.55 | 1.61 |

Visual observations of the electrode surface following the energy storage system failure and prior to the polarity being reversed showed build up of the lead dioxide on the original positive electrode in the first polarity. Subsequent visual observations of the electrode surface after several charge and discharge cycles following the polarity reversal confirmed that the lead dioxide that was on the original positive electrode following the energy storage system failure and prior to the polarity being reversed had been fully reduced back into the electrolyte solution. Accordingly, the deposit "creeping" (e.g., lead creep) that can result in cell/battery failure can be effectively avoided and/or reversed by following the polarity flip charge/discharge protocol. Again, some embodiments monitor operational parameters (e.g., voltage, current, voltage efficiency, current efficiency, energy efficiency, discharge voltage, predefined number of charge/discharge cycles, concentrations within the electrolyte, and/or other relevant parameters) to implement a flip of the polarity before relatively significant drop offs in energy efficiency occur. As described above, in some embodiments, the controller 340 and/or the polarity reversal system can implement the polarity reversal based on regular intervals of polarity flipping, number of charge discharge cycles, tracking one or more operational parameters relative to corresponding thresholds and/or other such monitoring, which can limit and/or prevent battery failure, at least due to deposit build up on the electrodes.

Some embodiments attempt to further enhance the performance, efficiency, longevity and/or operation of the energy storage system 410 and/or energy storage unit 412 through chemical composition and/or concentrations of the electrolyte relative to the electrodes, and/or through the addition of one or more additives to the electrolyte. The concentrations of the electrolytes can vary significantly depending on the intended charge voltage, discharge voltage, electrolyte composition, electrode composition, and/or other such factors. For example, the electrolyte can be an acid based electrolyte with the deposit (e.g., a metal or other conductive material) incorporated and/or dissolved. In some embodiments, with lead (II) deposited in a methanesulfonic acid based electrolyte, the acid concentration can be from relatively low (e.g., 0.001 M) to 2M, 3M or more depending on implementation, with a lead concentration from about 0.001M to 2-3M or more depending on implementation. Other embodiments additionally or alternatively utilize other acids as part of the electrolyte, such as but not limited to percholoric acid, hydrochloric acid, hexafluorosilicic acid, tetrafluoroboric acid and/or other such acids.

Further, some of additives can be included, for example, that can influence the quality of the deposit 430, 432 on the electrodes 422, 424. Some embodiments attempt to improve the deposition of the deposit 430 and/or 432 onto the electrode(s), such as trying to improve the formation of one or both the deposits (e.g., lead and lead dioxide) during a numbers of charge and discharge cycles. In many embodiments, it is advantageous that the discharged electrolyte contains a high concentration of lead (Pb(II)), and in some implementations at the end of charging, the concentration of lead in the electrolyte is decreased to a relatively low level and/or a lowest possible level (e.g., in order to minimize the volume of electrolyte that is stored and circulated). Further, some embodiments attempt to compensate for differences in rates of deposition where the lead and proton concentrations are not independent (e.g., the removal of 1 mole of lead (Pb(II)) during charge typically also leads to the formation of 2 mole of protons), and as such the influence of acid concentration on the quality of the deposits can be controlled. As such, some embodiments incorporate additives such as but not limited to one or more of: Hydrogen Peroxide, Hexadecyltrimethylammonium hydroxide, Hexadecyltrimethylammonium tosylate, Dimethyldodecylethylammonium hydroxide, N,N-Dimethyldodecylamine N-oxide, Benzylceryldimethylammonium chloride, Benzethonium hydroxide, Sodium ligninsulfonate, Glycolic acid ethoxylate 4-nonylphenyl ether, Brij™ 56, Tyloxapol™, Triton™ X100, and/or other such additives. Similarly, the acid concentration, surface area of electrodes, electrode composition and other such factors can also influence performance.

In some embodiments, multiple energy storage units 412 can be cooperatively utilized to store and supply the electrical power to the load 418. For example, multiple energy storage units 412 can be cooperated and/or configured into a stack, or multiple stacks. Furthermore, in some implementations, multiple stacks can be cooperated together to store and deliver electrical power to the load.

Figure 9A:
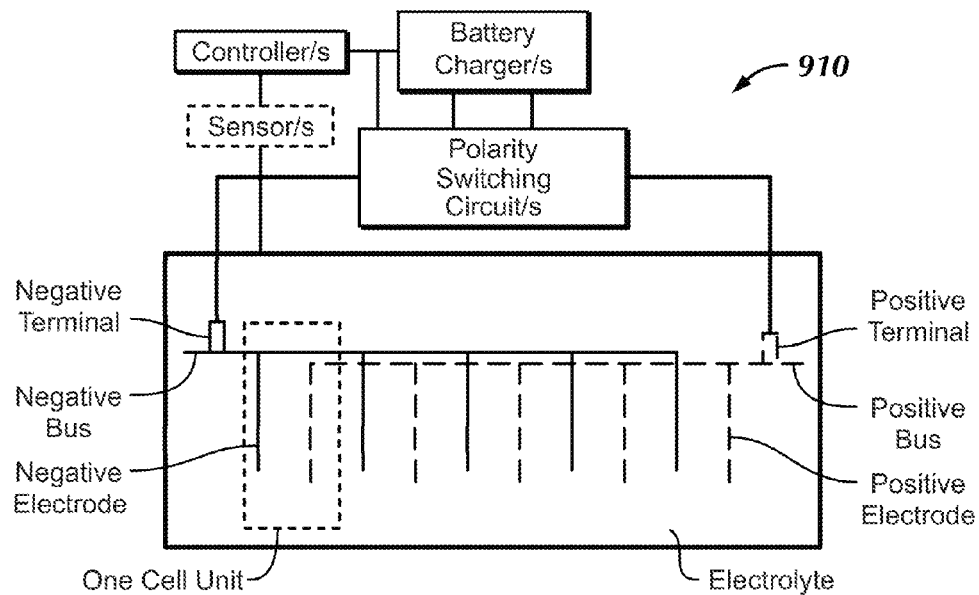
FIG. 9A shows a simplified block diagram of an exemplary energy storage system having a plurality of energy storage units coupled in series, in accordance with some embodiments.

FIG. 9A shows a simplified block diagram of an exemplary energy storage system 910 having a plurality of energy storage units coupled in series, in accordance with some embodiments. In some embodiments, the energy storage units are cooperated in a stack. The energy storage system further includes one or more chargers, polarity reversal systems and controllers. One or more sensors, detectors or other such monitoring devices may optionally also be included (e.g., voltage sensor, current sensor, polarity detector, etc.). In some embodiments, the energy storage units are positioned within a single housing or the like with an electrolyte at least in contact with the positive and negative electrodes. The cooperation of the energy storage units allows the energy storage system to store additional energy. Further, similar to the energy storage unit 412 of FIG. 4, the polarity of the energy storage units can be reversed through the one or more polarity reversal systems. Typically, the polarity of each of the energy storage units coupled in series are reversed at the same time to allow the energy storage units to be reconditioned to improve performance and/or restore the performance of the energy storage units.

Figure 9B:
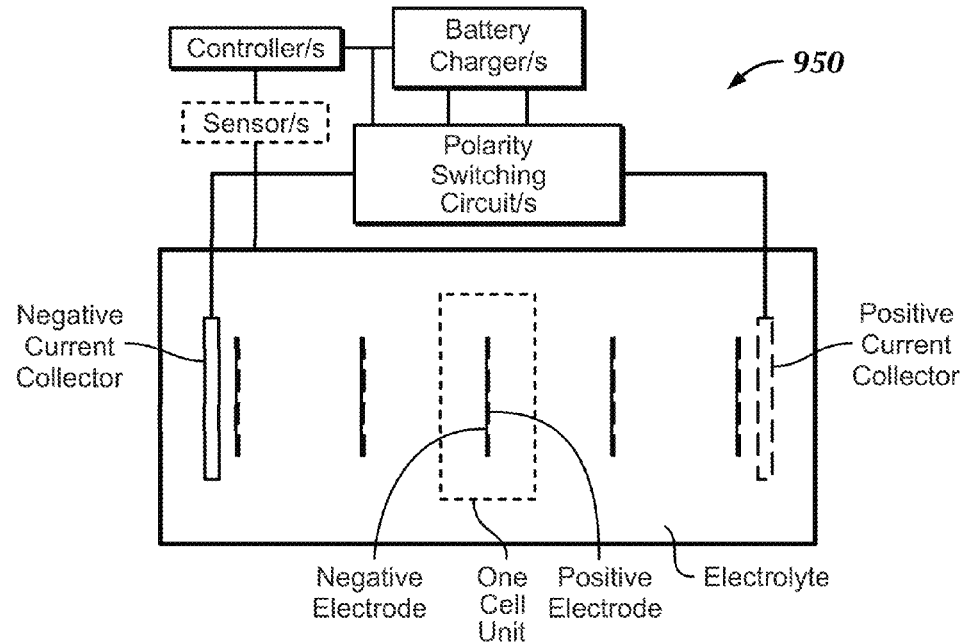
FIG. 9B shows a simplified block diagram of an exemplary energy storage system having a plurality of energy storage units coupled in parallel, in accordance with some embodiments.

FIG. 9B shows a simplified block diagram of an exemplary energy storage system 950 having a plurality of energy storage units coupled in parallel, in accordance with some embodiments. In some embodiments, the energy storage units are cooperated in a stack. The energy storage system further includes one or more chargers, polarity reversal systems and controllers. One or more sensors, detectors or other such monitoring devices may also be included (e.g., voltage sensor, current sensor, polarity detector, etc.). In some implementations a separate polarity reversal system may be associated with each energy storage unit and/or a polarity reversal system may be configured to independently reverse the polarity of multiple energy storage units. Similarly, one or more sensors may optionally be associated with one or more of the energy storage units, for example one or more sensors may be associated with each energy storage unit to individually monitor each energy storage unit in determining that the individual energy storage units are meeting predefined and/or expected specifications, standards and/or thresholds. In some embodiments, the energy storage units are positioned within a single housing or the like with an electrolyte at least in contact with the positive and negative electrodes.

In some embodiments, the parallel coupling of the energy storage units additionally allows the polarity of each energy storage unit to be independently reversed. For example, a polarity of one or more of the energy storage units may be maintained in a first polarity while the polarity of one or more other energy storage units are reversed to a second polarity. This allows the energy storage system to continue to supply electrical energy to the load while also reconditioning one or more energy storage units.

As described above, some embodiments provide energy storage systems comprising one or more stacks of energy storage units. The energy storage units or cells of a stack can be similar to the energy storage units or cells 412 of FIG. 4. The energy storage systems can include one or more charge sources or charging systems, polarity reversal systems, loads, controllers, electrolyte reservoirs, conduits, one or more pumps, sensors, and/or other relevant components of an energy storage and delivery system. The one or more electrolyte reservoirs store the electrolyte and the one or more pumps circulate the electrolyte through the energy stacks.

In some embodiments, the energy storage units of the stack are maintained separate while sharing the electrolyte. In other embodiments, the energy storage units are cooperated into a single housing with the electrolyte circulated through the housing. Each energy storage unit comprises two or more electrodes separated by a distance with the electrolyte contacting each of the electrodes. In some embodiments, the polarity reversal system causes a reversal of the polarity across each of the energy storage units. In other embodiments, the polarity reversal system can reverse less than all of the energy storage units or each energy storage unit individually. Again, some embodiments may include multiple polarity reversal systems. For example, in some implementations, two or more of the energy storage units are coupled in parallel allowing individual control over some or all of the energy storage units. Similarly, one or more energy storage units may also be or alternatively be coupled in series. Accordingly, the energy storage system may include multiple sensors (e.g., one sensor for each energy storage unit) to monitor operation of each energy storage unit.

Further, some embodiments selectively reverse the polarity of individual stacks and/or individual energy storage units. For example, the voltage polarity reversal may be staggered across the plurality of stacks and/or energy storage units to ensure that there is stored electrical energy that can be supplied to the load (assuming that there was sufficient energy to charge the energy storage units). Again, such systems can be utilized with generators, solar cells, wind turbines, and other such sources of energy to be stored and distributed to one or more loads. The distribution of the energy can be on demand, based on a schedule or other relevant discharge of energy from the energy storage system.

Figure 10:
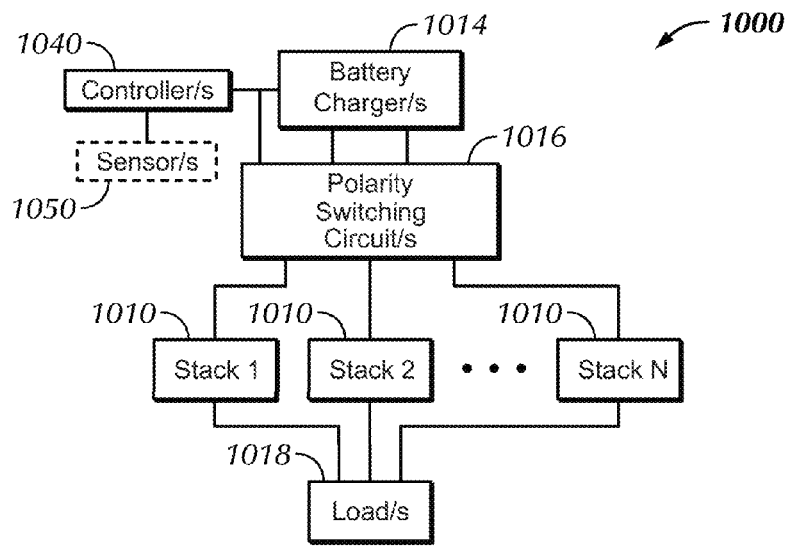
FIG. 10 shows a simplified block diagram of an exemplary energy storage system comprising multiple stacks of energy storage units in accordance with some embodiments.

FIG. 10 shows a simplified block diagram of an exemplary energy storage system 1000 comprising multiple stacks of energy storage units in accordance with some embodiments. The energy storage system includes multiple stacks 1010 of energy storage units. In some embodiments, the energy storage system includes one or more charge sources or charging systems 1014, polarity reversal systems 1016, loads 1018, controllers 1040, electrolyte reservoir, conduits, one or more pumps, sensors 1050, and/or other relevant components of an energy storage and delivery system. The one or more electrolyte reservoirs store electrolyte and the pumps circulate the electrolyte through one or more corresponding energy stack or stacks 1010.

In some embodiments, the stacks 1010 are coupled to a single electrolyte reservoir. In other embodiments, each stack 1010 may be associated with a corresponding electrolyte reservoir, pump and conduits, or groups of stacks may be cooperated with separate electrolyte reservoirs. Further, the energy storage units of each stack may be collectively controlled or individually controlled depending on how the energy storage units are coupled. Similarly, the stacks 1010 may be collectively controlled or individually controlled depending on how the stacks are coupled with the load 1018. For example, two or more of the stacks 1010 may be coupled in parallel allowing independent polarity control of at least the two stacks relative to each other.

Figure 11:
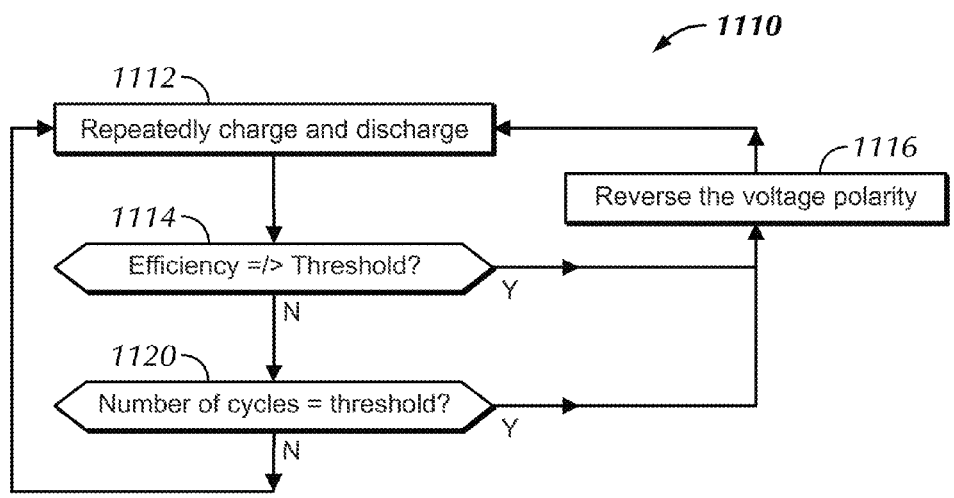
FIG. 11 depicts a simplified flow diagram of a process of controlling the polarity reversal of an energy storage system in accordance with some embodiments.

FIG. 11 depicts a simplified flow diagram of a process 1110 of controlling the polarity reversal of an energy storage system in accordance with some embodiments. In step 1112, energy storage units of the energy storage system (e.g., energy storage system 1080) are repeatedly charged and discharged to supply power to a load 1018. In step 1114, it is determined whether one or more operational parameters (e.g., an efficiency parameter, count, etc.) of an energy storage unit have a predefined relationship with one or more corresponding thresholds. For example, it can be determined whether the energy efficiency has dropped below a predefined energy efficiency threshold. In those instances, where it is determined that the efficiency parameter has the predefined relationship with the threshold the process advances to step 1116. In some embodiments, the efficiency parameter is associated with a stack 1010 of energy storage units, while in other embodiments the polarity of one or more energy storage units may be controlled in a group or individually. In step 1116, the polarity reversal system 1016 is activated to reverse the voltage polarity of one or more stacks 1010, or one or more energy storage units.

In those instances where the efficiency parameter does not have the predefined relationship with the threshold, the process continues to step 1120 where it is determined whether a predefined number of charge and discharge cycles have occurred while in a first voltage polarity. Again, the number of charge and discharge cycles can be associated with multiple stacks or a single stack 1010 of energy storage units, or can be specific to one or more energy storage units as a group or individually. When the predefined number of charge and discharge cycles has occurred while in the first polarity, the process continues to step 1116 to reverse the voltage polarity of one or more stacks 1010 or one or more energy storage units. The process then returns to step 1112 to continue to monitor.

Again, the process 1110 can be performed per energy storage unit 412, based on a group of energy storage units, based on a stack 1010, based on a plurality of stacks 1010 or a combination thereof. As such, voltage polarity of the energy storage system 1080 can be globally controlled, controlled in groups or controlled on an individual basis.

As another example, an energy storage system similar to that of FIG. 1 was constructed. The two electrodes are formed from two graphite plates positioned within a beaker cell and separated by about a half inch. The electrolyte comprised lead (II) deposited in a methanesulfonic acid with a methanesulfonic acid concentration of about 1.0M, a lead concentration of about 0.7M, with an electrolyte volume of 175 mL. The energy storage unit was charged at a rate of 75 mA (or 10 mA/cm$^2$) for an hour, and discharged at a rate of 75 mA at a discharge voltage of 1.1 V with the electrolyte being stirred at a flow rate of 600 RPM. FIGS. 7 and 6 above show graphic representations of the measured charge and discharge voltage and currents. The resulting average efficiencies measured while charging and discharging in the first polarity and after reversing to the second polarity were as follows:

|  | First Polarity | Second Polarity |
| --- | --- | --- |
| Voltage Efficiency | 78.98 | 78.70 |
| Current Efficiency | 92.07 | 92.99 |
| Energy Efficiency | 72.73 | 73.06 |
| Charge Voltage | 2.00 | 2.00 |
| Discharge Voltage | 1.58 | 1.57 |
| Number of Cycles | 4 | 5 |

Figure 12:
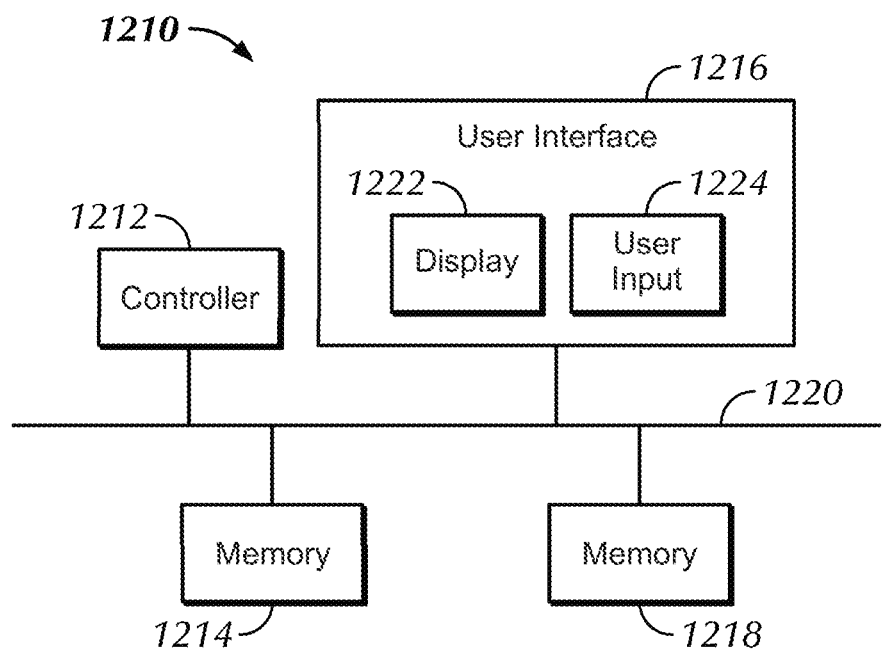
FIG. 12 illustrates a system for use in implementing methods, techniques, devices, apparatuses, systems, servers, sources and the like in providing user interactive virtual environments in accordance with some embodiments.

The methods, techniques, systems, devices, services, servers, sources and the like described herein may be utilized, implemented and/or run on many different types of devices and/or systems. Similarly, the controllers 440, 1040 and/or polarity reversal systems 116, 416, 1016 can be implemented through one or more controllers, computers, microprocessors and the like. Referring to FIG. 12, there is illustrated a system 1200 that may be used for any such implementations, in accordance with some embodiments. One or more components of the system 1200 may be used for implementing any system, apparatus, controller or device mentioned above or below, or parts of such systems, apparatuses, controller or devices, such as for example any of the above or below mentioned controllers 440, 1040, polarity reversal systems 116, 416, 1016, and the like. However, the use of the system 1200 or any portion thereof is certainly not required.

By way of example, the system 1200 may comprise a controller or processor module 1212, memory 1214, and one or more communication links, paths, buses or the like 1220. Some embodiments include a user interface 1216, and one or more transceivers 1218 or other such communication components, such as ports to communication with remote devices over the Internet, cellular communication and/or other such communication protocols. A power source or supply (not shown) can be included or coupled with the system 1200.

The controller 1212 can be implemented through one or more processors, microprocessors, central processing unit, computers, logic, local digital storage, firmware, networked devices, and/or other control hardware and/or software, and may be used to execute or assist in executing the steps of the methods and techniques described herein, and control various communications, programs, listings, services, interfaces, sensors, polarity reversal systems 116, etc. The user interface 1216 can allow a user to interact with the system 1200 and receive information through the system. In some instances, the user interface 1216 includes a display 1122 and/or one or more user inputs 1224, such as a remote control, keyboard, mouse, track ball, buttons, touch screen, etc., which can be part of or wired or wirelessly coupled with the system 1200. Additionally or alternatively, the user interface 1216 may be implemented remotely such as through a computer or mobile device (with accompanying keyboard, touch screen, mouse, buttons, etc.) providing a user with remote access to and/or control over the control module 1212 (e.g., to adjust thresholds, manually activate one or more polarity reversals, obtain reports, set parameters and/or other interaction).

Typically, the system 1200 further includes one or more communication interfaces, ports, transceivers 1218 and/or the like allowing the system 1200 to communication over a distributed network, a local network, the Internet, communication link 1220, other networks or communication channels with other devices and/or other such communications. Further the transceiver 1218 can be configured for wired, wireless, optical, fiber optical cable or other such communication configurations or combinations of such communications.

The system 1200 comprises an example of a control and/or processor-based system with the controller 1212. Again, the controller 1212 can be implemented through one or more processors, controllers, central processing units, logic, software, distributed computers, databases, processors, and the like and/or combinations thereof. Further, in some implementations the controller 1212 may provide multiprocessor functionality.

The memory 1214, which can be accessed by at least the controller 1212, typically includes one or more processor readable and/or computer readable media accessed by at least the controller 1212, and can include volatile and/or nonvolatile media, such as RAM, ROM, EEPROM, flash memory and/or other memory technology. Further, the memory 1214 is shown as internal to the system 1210; however, the memory 1214 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. Additionally or alternatively, the memory can be one or more remote memory and/or databases accessed over a network (e.g., a LAN, WAN, the Internet, etc.). The memory 1214 can store code, software, executables, scripts, data, thresholds, parameters, instructions, programming, programs, textual content, identifiers, log and/or history data or reports, user information and the like.

One or more of the embodiments, methods, processes, approaches, and/or techniques described above or below may be implemented in one or more computer programs executable by a processor-based system. By way of example, such a processor based system may comprise one or more of the processor based systems 1200, computers, graphics workstation, smart phones, tablet, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for controlling the storing or distribution of energy and/or the polarity reversal of the one or more energy storage units 112, 412, 1012 and/or stacks 1010. As another example, such computer programs may be used for implementing any type of system, device, tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more tangible computer-readable storage mediums storing one or more computer programs for use with a computer simulation, the one or more computer programs configured to cause a computer and/or processor based system to execute steps comprising: repeatedly charging and discharging a first chemical cell while in a first polarity to provide electrical power during the discharging to a load; reversing a voltage polarity of the first chemical cell to a second polarity opposite the first polarity after the repeatedly charging and discharging the first chemical cell while in the first polarity; and repeatedly charging and discharging the first chemical cell while in the second polarity to continue to provide substantially the same electrical power to the load during the discharging while in the second polarity as provided during the discharging while in the first polarity.

Some present embodiments provide energy storage units and/or systems that differ from traditional lead-acid batteries and other flow and/or redox flow batteries or cells. For example, some embodiments provide one or more deposit species (e.g., lead, Pb(II)) that is highly soluble in a solution (e.g., an aqueous acid electrolyte, methanesulfonic acid, percholoric acid, hydrochloric acid, hexafluorosilicic acid, tetrafluoroboric acid, etc.). Further, some embodiments are implemented utilizing a single electrolyte, and/or can be implemented using a single cell configuration without the need for a separator or membrane. This typically reduces the cost and design complexity of the energy storage unit and/or system significantly.

The electrode reactions involve the conversion of the soluble species into a solid phase during charging and dissolution at the discharging phase of cycles. Still further, many embodiments provide for polarity reverse at substantially any phase of the charging and/or discharging without causing damage to the energy storage system and/or unit(s). The polarity reversal can address some potential issues that might otherwise result from the repeated charging and discharging. For example, the repeated charging and discharging in a single polarity introduces complexities to the electrode reactions and can reduce the performance of the battery as a result of build up of the deposit species growing across the interelectrode gap short circuiting the energy storage unit, build up over non-conductive areas extending to unintended conductive components resulting in reduced efficiencies and/or shorts. Upon the polarity reversal, the energy storage system and/or unit(s) can rapidly remove any built up deposits and effectively return the energy storage unit(s) to initial conditions, thus improving and/or maintaining a high efficiency. Further, in at least some embodiments, the polarity can be reversed while continuing to repeatedly charge and discharge the energy storage unit(s) while in the reversed polarity and continue to supply power to the load. Still further, the polarity reversal or flipping can be repeated multiple times with multiple charge and discharge cycles occurring following each polarity reversal.

Some embodiments provide a bipolar electrode or plate design that allows for the complete reversal of the voltage polarity of the electrodes with respect to an original voltage polarity configuration. By forcing the current to flow in the opposite direction, stripping of the electrode surface of the deposited species occurs even with charge efficiency imbalances, thereby substantially resetting the initial electrode surfaces and in at least some implementations resetting the electrolyte conditions. In addition, the energy storage unit(s) and/or system can be operated in the reversed polarity over many sequential charge and discharge cycles with no harm to the system, allowing for still further subsequent polarity reversals as desired to maintain efficient operation. Accordingly, some embodiments successfully and specifically address at least the problems of species deposit shorts due to creeping, dendrite shorts, energy capacity fade, and/or other such effects.

While the invention herein disclosed has been described by means of specific embodiments, examples and applications thereof, numerous modifications and variations could be made thereto by those skilled in the art without departing from the scope of the invention set forth in the claims.

What is claimed is:

1. An energy storage system comprising:
a first electrode;
a second electrode without a separator between the first electrode and the second electrode;
an electrolyte;
a housing in which at least a portion of the first electrode, at least a portion of the second electrode and at least a portion of the electrolyte are positioned such that the electrolyte is in contact with at least the first electrode;
a polarity reversal system electrically coupled with the first electrode and the second electrode, wherein the polarity reversal system is configured to allow the energy storage system to operate while a first polarity is established across the first electrode and the second electrode to repeatedly charge and discharge electrical energy while operating in the first polarity providing power to a load configured to be coupled to the first electrode and the second electrode, and the polarity reversal system is configured to reverse the voltage polarity across the first electrode and the second electrode to a second polarity that is opposite the first polarity to allow the energy storage system to continue to operate while the second polarity is established across the first electrode and the second electrode to continue to repeatedly charge and discharge electrical energy while operating in the second polarity providing power to the load;

multiple first electrodes and multiple second electrodes; and multiple energy storage units electrically cooperated to provide electrical energy to the load, wherein each energy storage unit of the multiple energy storage units comprises one of the plurality of the first electrode and one of the plurality of the second electrode;

wherein the polarity reversal system is further configured to reverse the polarity of a first energy storage unit of the multiple energy storage units to operate in the second polarity while maintaining a second energy storage unit of the multiple energy storage units in the first polarity to simultaneously continue to operate to charge and discharge in the first polarity.

2. The energy storage system of claim 1, wherein the polarity reversal system is further configured to allow the energy storage system to charge and discharge electrical energy over multiple cycles of charging and discharging while operating in the first polarity, and to charge and discharge electrical energy over multiple consecutive cycles of charging and discharging while operating in the second polarity.

3. The energy storage system of claim 2, wherein the charging of the energy storage system in the first polarity comprises causing a chemical reaction within the housing to deposit a conductive material onto the first electrode, and wherein the charging of the energy storage system in the second polarity comprises causing the chemical reaction within the housing to deposit the conductive material onto the second electrode while the conductive material deposited on to the first electrode is removed from the first electrode.

4. The energy storage system of claim 3, wherein the electrolyte comprises a liquid electrolyte comprising lead ions wherein the deposit of conductive material comprises lead;

wherein lead is deposited on the first electrode and lead dioxide is deposited on the second electrode while charging in the first polarity; and wherein lead dioxide is deposited on the first electrode while lead is being removed from the first electrode while charging in the second polarity, and lead is deposited on the second electrode while lead dioxide is being removed from the second electrode while charging in the second polarity.

5. The energy storage system of claim 2, further comprising:

a controller coupled with the polarity reversal system, wherein the controller is configured to determine whether a change in operation of the energy storage system has a predefined relationship with a threshold, and to cause the polarity reversal system to reverse the voltage polarity in response to determining that the change in operation of the energy storage system has the predefined relationship with the threshold.

6. The energy storage system of claim 1, further comprising:

a controller coupled with the polarity reversal system, wherein the controller is configured to monitor an operational parameter of the energy storage system and to determine whether the operational parameter of the energy storage system has a predefined relationship with a threshold, and to cause the polarity reversal system to reverse the voltage polarity in response to determining that the operational parameter has the predefined relationship with the threshold.

7. The energy storage system of claim 6, wherein the operational parameter comprises a number of charge and discharge cycles and the threshold comprises a threshold number of cycles.

8. The energy storage system of claim 1, further comprising:

a pump cooperated with the housing, wherein the electrolyte comprises a fluid and the pump is configured to cause the electrolyte to flow within the housing such that the electrolyte is in contact with the first electrode and the second electrode, and wherein there is no separator between the first electrode and the second electrode.

9. An energy storage system comprising:

a first electrode;

a second electrode without a separator between the first electrode and the second electrode;

an electrolyte;

a housing in which at least a portion of the first electrode, at least a portion of the second electrode and at least a portion of the electrolyte are positioned such that the electrolyte is in contact with at least the first electrode;

a polarity reversal system electrically coupled with the first electrode and the second electrode, wherein the polarity reversal system is configured to allow the energy storage system to operate while a first polarity is established across the first electrode and the second electrode to repeatedly charge and discharge electrical energy while operating in the first polarity providing power to a load configured to be coupled to the first electrode and the second electrode, and the polarity reversal system is configured to reverse the voltage polarity across the first electrode and the second electrode to a second polarity that is opposite the first polarity to allow the energy storage system to continue to operate while the second polarity is established across the first electrode and the second electrode to continue to repeatedly charge and discharge electrical energy while operating in the second polarity providing power to the load;

multiple first electrodes and multiple second electrodes;

multiple energy storage units electrically cooperated to provide electrical energy to the load, wherein each energy storage unit of the multiple energy storage units comprises one of the plurality of the first electrode and one of the plurality of the second electrode; and multiple stacks, wherein each stack of the multiple stacks comprises a plurality of energy storage units of the multiple energy storage units, and wherein the polarity reversal system is further configured to reverse the polarity of each energy storage unit of a first stack of the multiple stacks to operate in the second polarity while maintaining energy storage unit of a second stack of the multiple stacks in the first polarity to operate in the first polarity.

10. A method of providing electrical energy, the method comprising:
repeatedly charging and discharging a first energy storage unit while in a first polarity to provide electrical power during the discharging to a load configured to be coupled with the first energy storage unit, wherein the energy storage unit comprises a first electrode and a second electrode without a separator between the first electrode and the second electrode and between which the first polarity is applied;
reversing a polarity of the first energy storage unit to a second polarity opposite the first polarity after the repeatedly charging and discharging the first energy storage unit while in the first polarity; and
repeatedly charging and discharging the first energy storage unit while in the second polarity to continue to provide substantially the same electrical power to the load during the discharging while in the second polarity as provided during the discharging while in the first polarity;
wherein the first energy storage unit is part of a first stack of a plurality of energy storage units wherein each of the plurality of energy storage units provides electrical power to the load; and
wherein the reversing the polarity of the first energy storage unit to the second polarity comprises reversing the polarity of the first stack and each of the plurality of energy storage units of the first stack.

11. The method of claim 10, further comprising:
contacting at least a portion of the first electrode and at least a portion of the second electrode with an electrolyte;
wherein the charging while operating in the first polarity comprises depositing a conductive material from the electrolyte onto the first electrode while in the first polarity; and
wherein the charging while operating in the second polarity comprises depositing the conductive material from the electrolyte onto the second electrode and removing the conductive material from the first electrode while in the second polarity.

12. The method of claim 11, further comprising:
determining whether a threshold has been reached; and
implementing the reversing of the polarity of the first energy storage unit to the second polarity in response to determining that the threshold has been reached.

13. The method of claim 12, wherein the determining whether the threshold has been reached comprises determining whether a predefined number of cycles of charging and discharging while in the first polarity has occurred.

14. The method of claim 10, further comprising:
flowing an electrolyte through the first energy storage unit such that the electrolyte is in contact with the first electrode and the second electrode of the first energy storage unit while in the first polarity and while in the second polarity, wherein the first energy storage unit does not include a separator between the first electrode and the second electrode and the electrolyte comprises a fluid.

15. The method of claim 10, wherein the reversing the polarity of the first stack comprises reversing the polarity of the first stack while simultaneously not reversing the polarity of a second stack configured to provide electrical power to the load in cooperation with the first stack.

16. A method of providing electrical energy, the method comprising:
repeatedly charging and discharging a first energy storage unit while in a first polarity to provide electrical power during the discharging to a load configured to be coupled with the first energy storage unit, wherein the energy storage unit comprises a first electrode and a second electrode without a separator between the first electrode and the second electrode and between which the first polarity is applied;
reversing a polarity of the first energy storage unit to a second polarity opposite the first polarity after the repeatedly charging and discharging the first energy storage unit while in the first polarity;
repeatedly charging and discharging the first energy storage unit while in the second polarity to continue to provide substantially the same electrical power to the load during the discharging while in the second polarity as provided during the discharging while in the first polarity; and
cooperating the first energy storage unit with a second energy storage unit in the first polarity such that both the first energy storage unit and the second energy storage unit both cooperatively provide electrical power to the load;
wherein the reversing the polarity of the first energy storage unit to the second polarity comprises reversing the polarity of the first energy storage unit to the second polarity while not reversing the polarity of a second energy storage unit and continuing to repeatedly charge and discharge the second energy storage unit while in the first polarity while performing the repeatedly charging and discharging of the first energy storage unit while in the second polarity.

17. An energy storage system comprising:
a first electrode;
a second electrode without a separator between the first electrode and the second electrode;
an electrolyte;
a housing in which at least a portion of the first electrode, at least a portion of the second electrode and at least a portion of the electrolyte are positioned such that the electrolyte is in contact with at least the first electrode;
a polarity reversal system electrically coupled with the first electrode and the second electrode, wherein the polarity reversal system is configured to allow the energy storage system to operate while a first polarity is established across the first electrode and the second electrode to repeatedly charge and discharge electrical energy while operating in the first polarity providing power to a load configured to be coupled to the first electrode and the second electrode, and the polarity reversal system is configured to reverse the voltage polarity across the first electrode and the second electrode to a second polarity that is opposite the first polarity to allow the energy storage system to continue to operate while the second polarity is established across the first electrode and the second electrode to continue to repeatedly charge and discharge electrical energy while operating in the second polarity providing power to the load;
multiple first electrodes and multiple second electrodes;
multiple energy storage units electrically cooperated to provide electrical energy to the load, wherein each energy storage unit of the multiple energy storage units comprises one of the plurality of the first electrode and one of the plurality of the second electrode; and a housing, wherein each of the multiple energy storage units are positioned within the housing and each of the energy storage units comprises one of the multiple first electrodes and one of the multiple second electrodes, wherein the electrolyte is in contact with the first electrodes and the second electrodes of each of multiple energy storage units.

\* \* \* \* \*